US011961449B2

(12) United States Patent
Liao et al.

(10) Patent No.: US 11,961,449 B2
(45) Date of Patent: Apr. 16, 2024

(54) LIQUID CRYSTAL DEVICE AND METHOD FOR COMPENSATING CURRENT LEAKAGE OF LCD

(71) Applicant: Shenzhen China Star Optoelectronics Semiconductor Display Technology Co., Ltd., Guangdong (CN)

(72) Inventors: Wenwu Liao, Guangdong (CN); Mingwei Chen, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 656 days.

(21) Appl. No.: 17/042,966

(22) PCT Filed: Aug. 7, 2020

(86) PCT No.: PCT/CN2020/107744
§ 371 (c)(1),
(2) Date: Sep. 29, 2020

(87) PCT Pub. No.: WO2022/007093
PCT Pub. Date: Jan. 13, 2022

(65) Prior Publication Data

US 2023/0117704 A1 Apr. 20, 2023

(30) Foreign Application Priority Data

Jul. 7, 2020 (CN) ......................... 202010647512.2

(51) Int. Cl.
*G09G 5/00* (2006.01)
*G09G 3/20* (2006.01)
*G09G 3/36* (2006.01)

(52) U.S. Cl.
CPC ......... *G09G 3/2096* (2013.01); *G09G 3/3674* (2013.01); *G09G 2320/0214* (2013.01);
(Continued)

(58) Field of Classification Search
CPC ............... G09G 3/2096; G09G 3/3674; G09G 2320/0214; G09G 2320/0233; G09G 2320/0247; G09G 2340/0435
(Continued)

(56) References Cited

U.S. PATENT DOCUMENTS

2014/0368418 A1 12/2014 Liu et al.
2015/0070345 A1* 3/2015 Liu .................... G02F 1/13306 345/99
(Continued)

FOREIGN PATENT DOCUMENTS

CN 101833920 9/2010
CN 102800288 11/2012
(Continued)

*Primary Examiner* — Jennifer T Nguyen

(57) ABSTRACT

A liquid crystal display (LCD) and a method for compensating current leakage of the LCD are provided. The LCD includes a thin film transistor (TFT) array having a plurality of TFTs, a gate driver configured to provide a scan signal, a source driver configured to provide a data signal, and a timing controller electrically connected to the gate driver and the source driver. The timing controller is configured to adjust a current refresh frequency according to a current frame rate and to transfer a control signal to the gate driver when the current refresh frequency is lower than a threshold frequency such that the gate driver increase a charging time of the plurality of TFTs according to the control signal.

10 Claims, 5 Drawing Sheets

(52) U.S. Cl.
CPC ............... *G09G 2320/0233* (2013.01); *G09G 2320/0247* (2013.01); *G09G 2340/0435* (2013.01)

(58) Field of Classification Search
USPC .......................................................... 345/214
See application file for complete search history.

(56) References Cited

U.S. PATENT DOCUMENTS

| | | | | |
|---|---|---|---|---|
| 2015/0070618 | A1 | 3/2015 | Liu | |
| 2016/0035297 | A1* | 2/2016 | Oh | G09G 5/006 345/94 |
| 2017/0148422 | A1* | 5/2017 | Huang | G09G 5/395 |
| 2019/0005862 | A1* | 1/2019 | Zhang | G09G 3/20 |
| 2021/0027708 | A1 | 1/2021 | Yamato et al. | |
| 2021/0049967 | A1 | 2/2021 | Zhang et al. | |

FOREIGN PATENT DOCUMENTS

| | | | |
|---|---|---|---|
| CN | 107610671 | 1/2018 | |
| CN | 110310600 | 10/2019 | |
| CN | 110570828 | * 12/2019 | G09G 3/36 |
| CN | 110751933 | 2/2020 | |
| KR | 10-2015-0035109 | 4/2015 | |
| KR | 10-2015-0077742 | 7/2015 | |
| WO | WO 2019/187063 | 10/2019 | |

* cited by examiner

LIQUID CRYSTAL DEVICE AND METHOD FOR COMPENSATING CURRENT LEAKAGE OF LCD

RELATED APPLICATIONS

This application is a National Phase of PCT Patent Application No. PCT/CN2020/107744 having International filing date of Aug. 7, 2020, which claims the benefit of priority of Chinese Patent Application No. 202010647512.2 filed on Jul. 7, 2020. The contents of the above applications are all incorporated by reference as if fully set forth herein in their entirety.

FIELD AND BACKGROUND OF THE INVENTION

The present disclosure relates to a liquid crystal device, and more particularly, to an LCD compensating the leakage issue generated during the vertical blank interval in a low frequency by increasing the charging time of each row of the TFTs.

As the development progress of the display panel, different display refreshing technique had been developed to dynamically adjust the refresh frequency to raise the smoothness of the display. However, when the refresh frequency is adjusted, the charging time for each row of thin film transistors (TFT) in the low refresh frequency is the same as that in the high refresh frequency. This means that the vertical blank internal T2 in the low refresh frequency is longer than the vertical blank internal T1 in the high refresh frequency, which is shown in FIG. 1.

In the condition that the vertical blank internal is longer, the voltage of the TFTs should be maintained for a longer time in order to maintain the luminance of the display panel. However, the leakage issue becomes more severe along with the long maintaining time period. This introduces a huge luminance difference between low refresh frequency and the high refresh frequency.

After the display panel dynamically switches from the high refresh frequency to the low refresh frequency, the vertical blank interval becomes longer and thus the voltage of the TFTs needs to be maintained for a longer time. This introduces a huge leakage issue and a flicker issue because of the above-mentioned huge luminance difference between low refresh frequency and the high refresh frequency.

Therefore, a leakage compensation mechanism needs to be provided to compensate the charging time of the TFTs in the low refresh frequency. In this way, the flicker issue, due to the luminance difference caused by the increased vertical blank interval, might be solved.

SUMMARY OF THE INVENTION

Technical Solution

One objective of an embodiment of the present disclosure is to provide a leakage compensation mechanism, which utilizes the timing controller in the LCD to adjust the current refresh frequency according to the current frame rate obtained by the graphic processor and to control the gate driver to increase the charging time of the TFTs when the current refresh frequency is lower than the threshold frequency.

Accordingly, the present disclosure could solve the above-mentioned leakage issue of the TFT caused by the longer vertical blank interval and the flicker issue caused by the huge luminance difference between low refresh frequency and the high refresh frequency without modifying the circuit design in the LCD panel.

According to an embodiment of the present invention, a liquid crystal display (LCD) is disclosed. The LCD comprises: a thin film transistor (TFT) array, comprising a plurality of TFTs; a gate driver, configured to provide a scan signal; a source driver, configured to provide a data signal; and a timing controller, electrically connected to the gate driver and the source driver, configured to adjust a current refresh frequency according to a current frame rate and to transfer a control signal to the gate driver when the current refresh frequency is lower than a threshold frequency such that the gate driver increase a charging time of the plurality of TFTs according to the control signal.

According to another embodiment of the present invention, a method for compensating current leakage of a liquid crystal display (LCD) is provided. The LCD comprises a thin film transistor (TFT) array having a plurality of TFTs, a gate driver configured to provide a scan signal, a source driver configured to provide a data signal, and a timing controller. The method executable by the timing controller comprises adjusting a current refresh frequency according to a current frame rate, and transferring a control signal to the gate driver when the current refresh frequency is lower than a threshold frequency such that the gate driver increases a charging time of the plurality of TFTs according to the control signal.

These and other features, aspects and advantages of the present disclosure will become understood with reference to the following description, appended claims and accompanying figures.

Advantageous Effects

The present disclosure could increase the turn-on time of the TFT when the LCD is switched from the high refresh frequency to the low refresh frequency. Therefore, the present disclosure could solve the above-mentioned leakage issue of the TFT caused by the longer vertical blank interval and the flicker issue caused by the huge luminance difference between low refresh frequency and the high refresh frequency without modifying the circuit design of the LCD.

DESCRIPTION OF SPECIFIC EMBODIMENTS OF THE INVENTION

Figure 1:
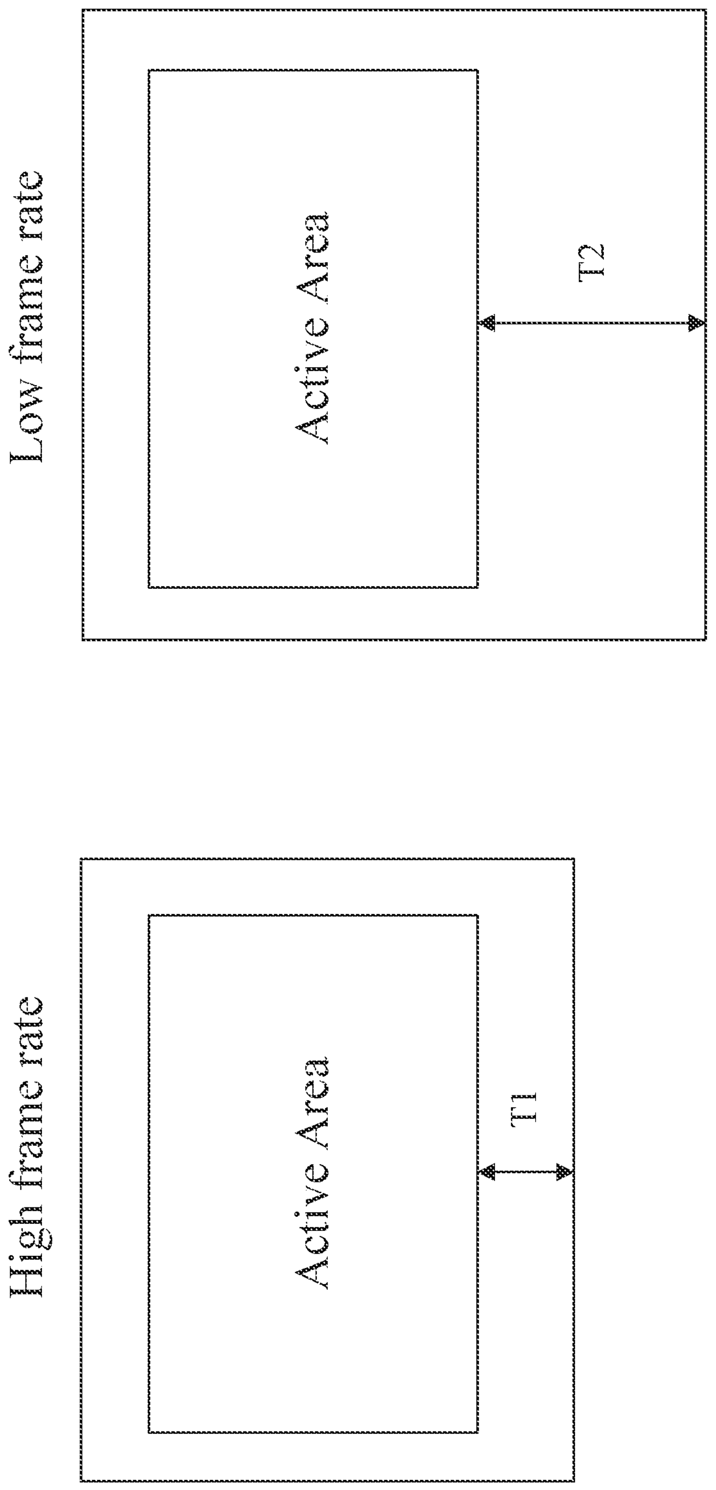
Fig. 1 (Prior art)
FIG. 1 is a diagram showing the vertical blank intervals in a conventional LCD under different refresh frequencies.

The invention is described below in detail with reference to the accompanying drawings, wherein like reference numerals are used to identify like elements illustrated in one or more of the figures thereof, and in which exemplary embodiments of the invention are shown. This invention may, however, be embodied in many different forms and should not be construed as limited to the particular embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

Figure 2:
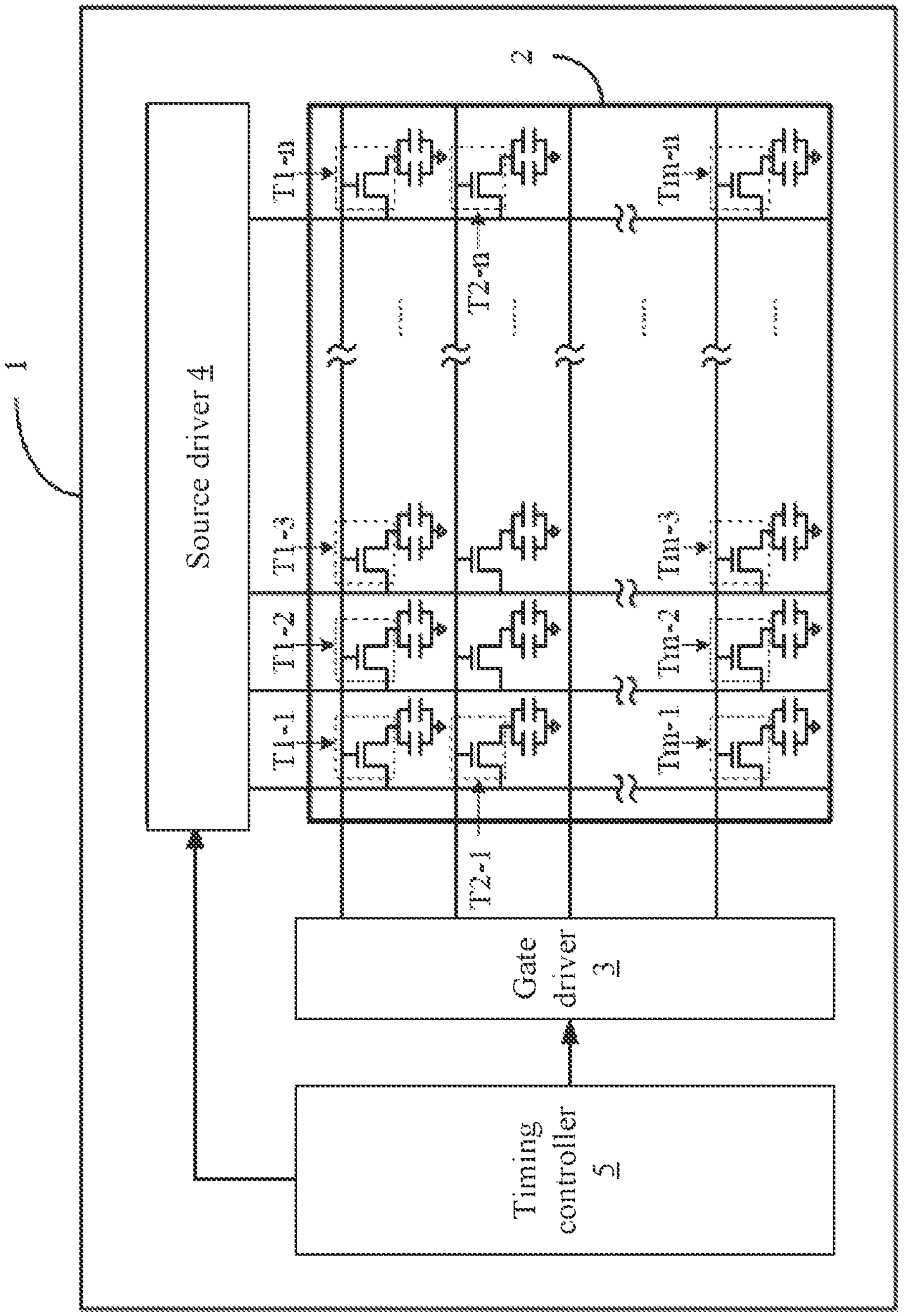
FIG. 2 is a diagram of an LCD according to an embodiment of the present invention.
Figure 3:
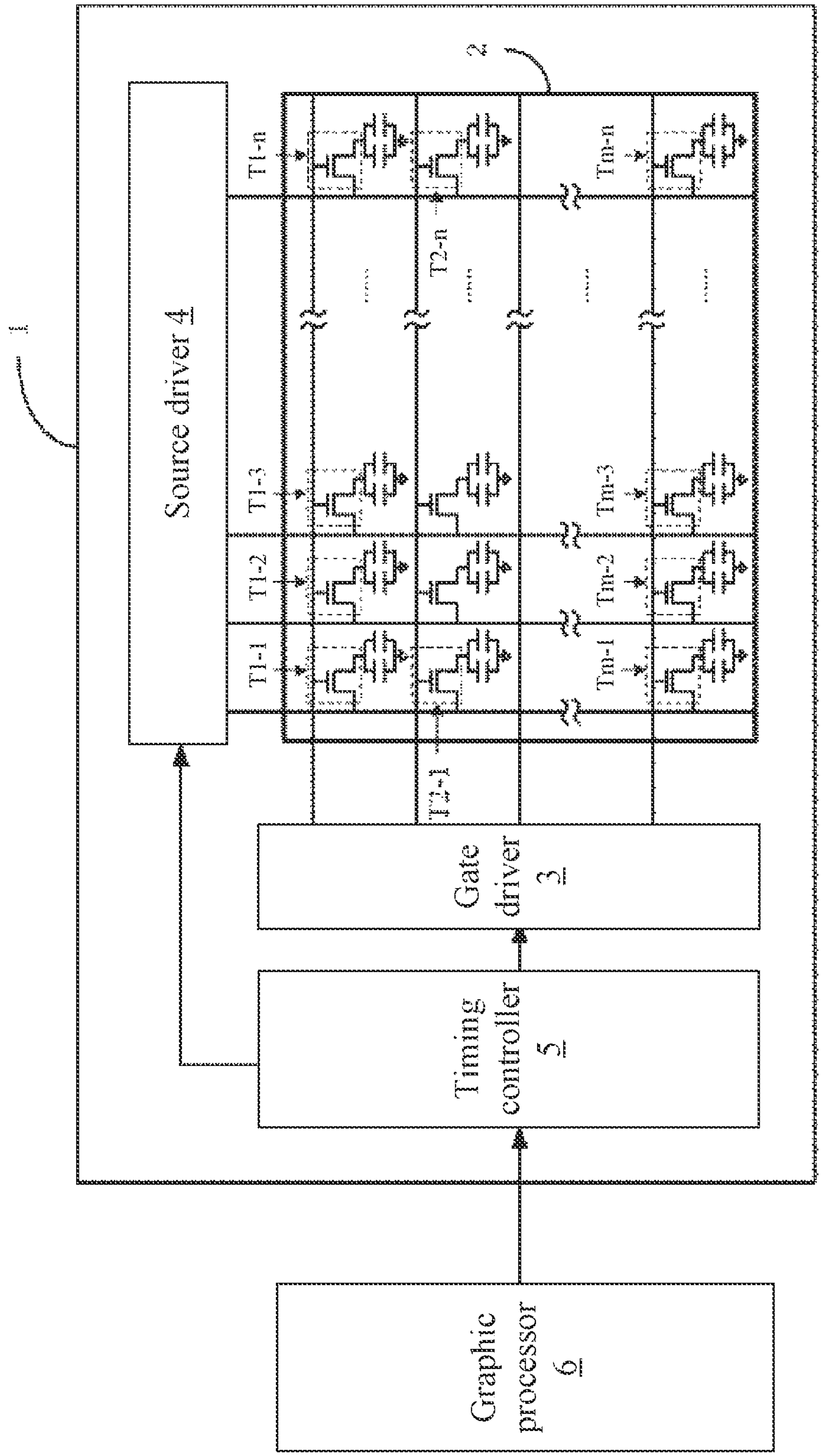
FIG. 3 is a diagram showing an LCD and a graphic processor according to an embodiment of the present invention.
Figure 4:
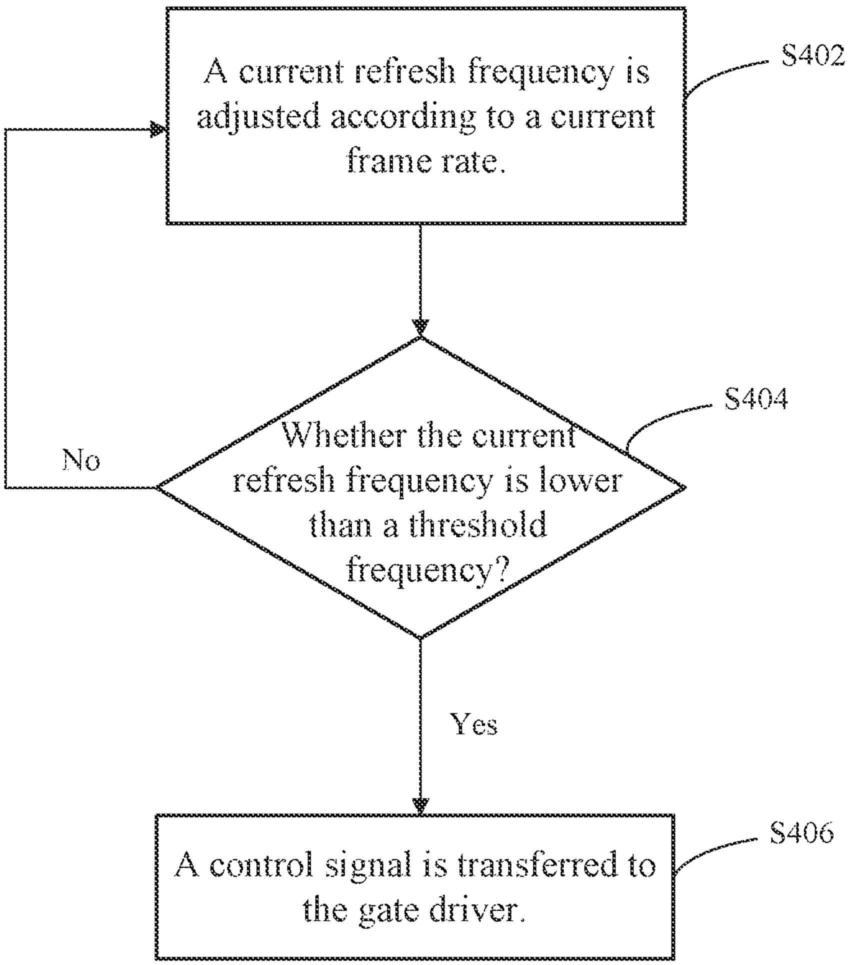
FIG. 4 illustrates a flowchart of a method for compensating current leakage of a liquid crystal display according to an embodiment of the present invention.

Please refer to FIG. 2 and FIG. 3. FIG. 2 is a diagram of an LCD according to an embodiment of the present invention. FIG. 3 is a diagram showing an LCD and a graphic processor according to an embodiment of the present invention. The LCD 1 comprises a TFT array 2, a gate driver 3, a source driver 4, and a timing controller 5. The TFT array 2 is composed of a plurality of TFTs T1-1-Tm-n. Each of the TFTs T1-1-Tm-n is electrically connected to the gate driver 3 such that the gate driver 3 could provide a scan signal row by row to turn on each row of the TFTs. Furthermore, the source of each of the TFTs T1-1-Tm-n is electrically connected to the source driver 4 such that the data signal could be provided to a row of the TFTs when the row of the TFTs are turned on by the gate driver 3 to charge LC capacitors and storage capacitors coupled to the drain of the TFTs.

Specifically, the gate driver 3 starts the scan operation from the first row (the TFTs T1-1, T1-2, T1-3 . . . and T1-*n*). After the gate driver 3 turns on the TFTs T1-1, T1-2, T1-3 . . . and T1-*n* of the first row, the source driver 4 simultaneously charges the TFTs T1-1, T1-2, T1-3 . . . and T1-*n* of the first row. Then, the gate driver 3 scans the second row (the TFTs T2-1, T2-2, T2-3 . . . and T2-*n*). After the gate driver 3 turns on the TFTs T2-1, T2-2, T2-3 . . . and T2-*n* of the second row, the source driver 4 simultaneously charges the TFTs T2-1, T2-2, T2-3 . . . and T2-*n* of the second row. Similarly, the gate driver 3 row by row scans the rows and the scanning operation reaches the $m^{th}$ row (the TFTs Tm-1, Tm-2, Tm-3 . . . and Tm-n). After the gate driver 3 turns on the TFTs Tm-1, Tm-2, Tm-3 . . . and Tm-n of the $m^{th}$ row, the source driver 4 simultaneously charges the TFTs Tm-1, Tm-2, Tm-3 . . . and Tm-n of the $m^{th}$ row. When the TFTs Tm-1, Tm-2, Tm-3 . . . and Tm-n of the $m^{th}$ row are completely charged, one refresh operation on the LCD 1 is completed.

In the above embodiment, only a few TFTs are shown in FIG. 2 and FIG. 3. However, this is only for illustration, not a limitation of the present invention. The number of the TFTs could be different and those changes fall within the scope of the present invention.

The timing controller 5 is electrically connected to the gate driver 3 and the source driver 4. The timing controller 5 is used to transfer the gate start impulses and gate clock pulses to the gate driver 3 such that the gate driver 3 generates the scan signal to turn on each row of the TFTs according to the gate clock pulses. Furthermore, the timing controller 5 is also used to transfer the source start impulses and the source clock pulses to the source driver 4 such that the source driver 4 generates the data signal according to the source clock pulses to charge the TFTs T1-1-Tm-n when the TFTs T1-1-Tm-n are turned on by the gate driver 3.

Then, the timing controller 5 adjusts the current refresh frequency according to the current frame rate. When the timing controller 5 determines that the current refresh frequency is lower than the threshold frequency, then the timing controller 5 transfer the control signal to the gate driver 3 such that the gate driver increases the charging time of the TFTs T1-1-Tm-n according to the control signal.

Please refer to FIG. 3. The frame rate represents the rate that the graphic processor 6 in the graphic card generates the frames. The refresh frequency represents the frequency that the gate driver 3 scans from the TFTs T1-1, T1-2, T1-3 . . . and T1-*n* of the first row to the TFTs Tm-1, Tm-2, Tm-3 . . . and Tm-n of the $m^{th}$ row array 2 per second. That is, the frame rate means the frequency that the LCD 1 gets updated. The time interval between gate driver 3 scans the $m^{th}$ row for the current frame and the gate driver 3 scans back to the first row for the next frame is called vertical blank interval.

The LCD 1 supports the Freesync technique and thus is able to dynamically adjust the refresh frequency. Therefore, after the timing controller 5 obtains the current frame rate from the graphic processor, the timing controller 5 could adjust the current refresh frequency of the LCD 1 to be the same as the current frame rate. In order to avoid the leakage issue caused by the increased vertical blank interval when the refresh frequency of the LCD 1 is low, the timing controller 5 could control the gate driver 3 to increase the charging time of the TFTs T1-1-Tm-n when the timing controller 5 determines that the current refresh frequency is lower than the threshold frequency.

The charging time of each row of the TFTs is determined from the rising edge of the scan signal to the rising edge of the gate clock pulse corresponding to the scan signal. Because the gate driver 3 generates the scan signal, which is used for turning on each row of the TFTs, according to the gate clock pulses, the timing controller 5 could control the gate driver 3 to put the clock of scan signal in advance through the control signal such that the charging time of the TFTs is increased.

For example, assume that the screen of the LCD 1 is updated 120 times per second (which means that the refresh frequency is 120 Hz). The charging time for the source driver 4 to charge the TFTs is 2 μs. Furthermore, the rate that the graphic processor 6 generates the frames is 60 frames per second (which means that the frame rate is 60 frame per second (FPS)) and the threshold frequency is 70 Hz. After the timing controller 5 receives the current frame rate 60 FPS from the graphic processor 6, the timing controller 5 adjusts the refresh frequency of the LCD 1 from 120 Hz to 60 Hz.

Then, the timing controller 5 further determines that the current refresh frequency 60 Hz is lower than the threshold frequency 70 Hz and transfer the control signal to the gate driver 3 to control the gate driver 3 to put the clock of the scan signal of each row in advance according to the control signal such that the charging time of the TFTs T1-1-Tm-n is increased from 2 μs to 4 μs. Accordingly, the present disclosure could solve the luminance unevenness and flicker issues of the LCD 1 caused by the leakage of the TFTs T1-1-Tm-n during the vertical blank interval.

In one embodiment, the timing controller 5 further calculates the vertical blank interval. When the vertical blank interval is longer than a threshold time period, the timing controller 5 transfers the control signal to the gate driver 3. That is, the timing controller 5 could determine whether to transfer the control signal to the gate driver 3 to increase the charging time according to not only the current refresh frequency of the LCD 1 but also the vertical blank interval. For example, when the current refresh frequency of the LCD 1 is lower than the threshold frequency and the vertical blank interval is longer than the threshold time period, the timing controller 5 transfers the control signal to the gate driver 3. Here, a person having ordinary skills in the art could understand how to calculate the time period of the vertical blank interval and further illustration is omitted here.

In one embodiment, the timing controller 5 calculates the leakage voltage of multiple TFTs at the current refresh frequency and determines the charging time of the TFTs according to the calculated leakage voltage.

In addition, in one embodiment, the timing controller 5 calculates a gray voltage maintaining time of the TFTs at the current refresh frequency and determines the charging time of the TFTs according to the gray voltage maintaining time.

If the vertical blank interval is longer, it represents that the displayed screen of the LCD 1 needs to be maintained for a longer time. This means that the gray voltage needs to be maintained for a longer time and thus the leakage of the TFTs becomes more severe. Therefore, in addition to determine the charging time by calculating the leakage voltage or gray voltage maintaining time, the present disclosure could further calculate the leakage current, the variance of the gray voltage, the pixel capacitance and/or the variance of the refresh frequency to adjust the charging time of the TFTs. All these changes fall within the scope of the present invention.

According to another embodiment of the present invention, a method for compensating current leakage of a liquid crystal display (LCD) is provided. The LCD comprises a thin film transistor (TFT) array having a plurality of TFTs, a gate driver configured to provide a scan signal, a source driver configured to provide a data signal, and a timing controller. Each gate of the TFTs is electrically connected to the gate driver, and each source of the TFTs is electrically connected to the source driver. The gate driver provides the scan signal to turn on the TFTs, and the source driver provides the data signal to charge the TFTs. The method executable by the timing controller comprises the following steps.

In step S402, a current refresh frequency is adjusted according to a current frame rate. In step S404, it is determined whether the current refresh frequency is lower than a threshold frequency. In step S406, a control signal is transferred to the gate driver when the current refresh frequency is lower than the threshold frequency such that the gate driver increases a charging time of the plurality of TFTs according to the control signal. When the current refresh frequency is greater than the threshold frequency, the step S402 is performed again.

In some embodiments, the current refresh frequency is identical to the current frame rate.

Figure 5:
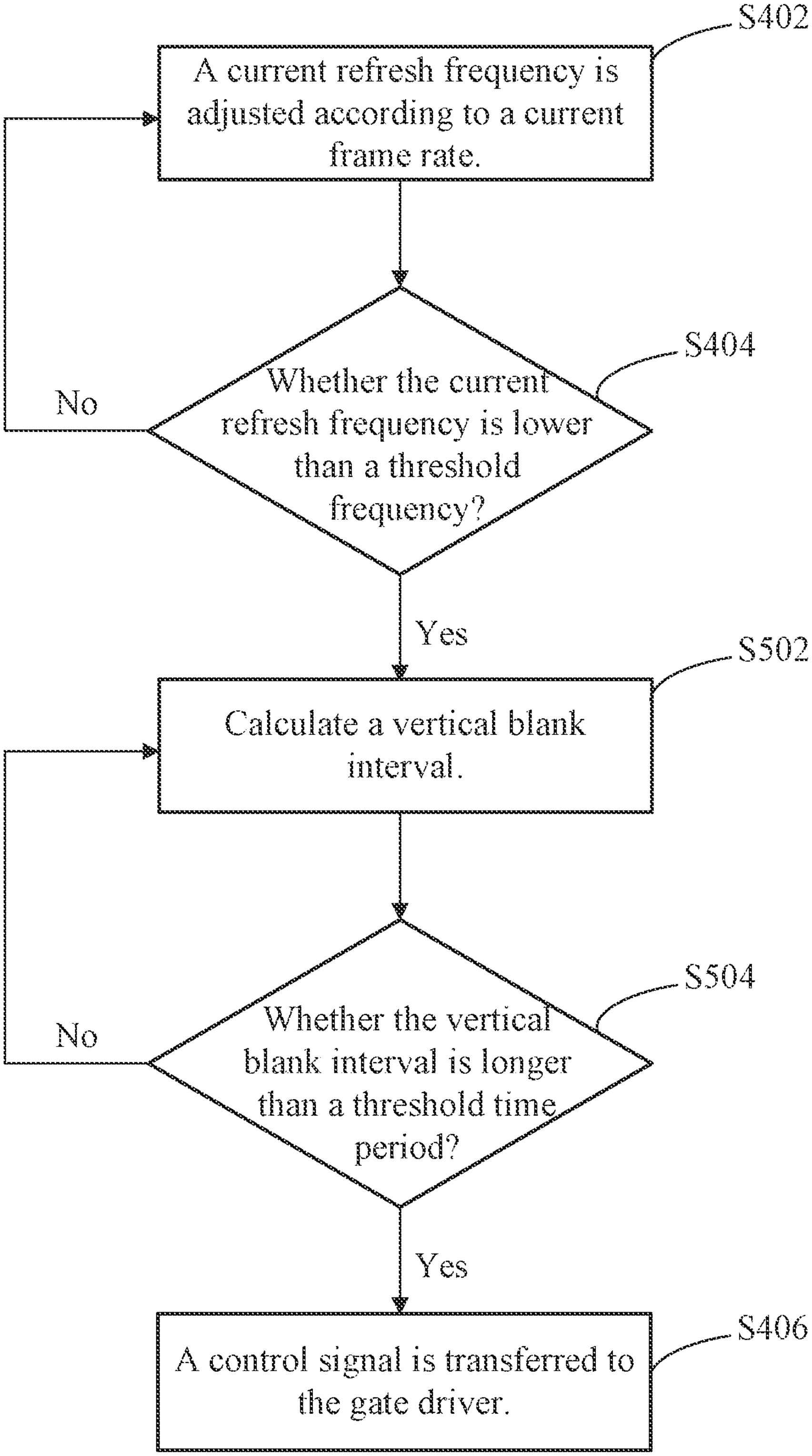
FIG. 5 illustrates a flowchart of a method for compensating current leakage of a liquid crystal display according to another embodiment of the present invention.

Referring to FIG. 5, in some embodiments, subsequent to the step S406, the timing controller executes the step S502 to calculate a vertical blank interval. The timing controller executes the step S504 to determine whether the vertical blank interval is longer than a threshold time period. The control signal is transferred to the gate driver when the vertical blank interval is longer than a threshold time period. When the vertical blank interval is lower greater than the threshold time period, the step S502 is performed again.

In some embodiments, the timing controller calculates a leakage voltage of the plurality of TFTs at the current refresh frequency and determines the charging time according to the leakage voltage.

In some embodiments, the timing controller calculates a gray voltage maintaining time of the plurality of TFTs at the current refresh frequency and determines the charging time according to the gray voltage maintaining time.

It will be understood by those of ordinary skill in the art that all or part of the blocks for implementing the method of the embodiments described above may be accomplished by a program that commands the relevant hardware. The program may be stored in a computer readable storage medium. When the program is executed, one of the blocks of the method embodiment or a combination thereof may be included.

From the above, the present disclosure could increase the charging time of the TFTs when the refresh frequency of the LCD is low without modifying the circuit design in the LCD panel in order to compensate the leakage problem caused by the longer vertical blank interval. Therefore, the present disclosure could improve the LCD having the Freesync function.

Because the LCD of the present disclosure could only need to adjust the charging time of the TFTs, the present disclosure could not only allow the Freesync certification to be timely obtained but also allow the customer to easily adopt this mechanism because no circuit design in the LCD panel is modified. In this way, the cost for development and manufacturing could be reduced and the early-stage product development efficiency and the late-stage verification efficiency could be both raised.

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal display (LCD), comprising:
- a thin film transistor (TFT) array, comprising a plurality of TFTs;
- a gate driver, configured to provide a scan signal;
- a source driver, configured to provide a data signal; and
- a timing controller, electrically connected to the gate driver and the source driver, configured to calculate a vertical blank interval, to adjust a current refresh frequency according to a current frame rate, and to transfer a control signal to the gate driver when the current refresh frequency is lower than a threshold frequency and the vertical blank interval is longer than a threshold time period such that the gate driver increase a charging time of the plurality of TFTs according to the control signal.

2. The LCD of claim 1, wherein the current refresh frequency is identical to the current frame rate.

3. The LCD of claim 1, wherein the timing controller calculates a leakage voltage of the plurality of TFTs at the current refresh frequency and determines the charging time according to the leakage voltage.

4. The LCD of claim 1, the timing controller calculates a gray voltage maintaining time of the plurality of TFTs at the current refresh frequency and determines the charging time according to the gray voltage maintaining time.

5. The LCD of claim 1, wherein the gate driver is configured to put a clock of the scan signal in advance to increase the charging time of the TFTs is increased.

6. A method for compensating current leakage of a liquid crystal display (LCD) that comprises a thin film transistor (TFT) array having a plurality of TFTs, a gate driver configured to provide a scan signal, a source driver configured to provide a data signal, and a timing controller, the method executable by the timing controller comprising:
- adjusting a current refresh frequency according to a current frame rate;
- calculating a vertical blank interval; and
- transferring a control signal to the gate driver when the current refresh frequency is lower than a threshold frequency and the vertical blank interval is longer than a threshold time period such that the gate driver increases a charging time of the plurality of TFTs according to the control signal.

7. The method of claim 6, wherein the current refresh frequency is identical to the current frame rate.

8. The method of claim 6, wherein the timing controller calculates a leakage voltage of the plurality of TFTs at the current refresh frequency and determines the charging time according to the leakage voltage.

9. The method of claim 6, the timing controller calculates a gray voltage maintaining time of the plurality of TFTs at the current refresh frequency and determines the charging time according to the gray voltage maintaining time.

10. The method of claim 6, further comprising controlling the gate driver through the control signal to put a clock of the scan signal in advance to increase the charging time of the TFTs is increased.

* * * * *